United States Patent [19]

Taylor et al.

[11] Patent Number: 4,892,051
[45] Date of Patent: Jan. 9, 1990

[54] SHOCK ISOLATION METHOD AND APPARATUS FOR SHIP-MOUNTED DEVICE

[75] Inventors: Douglas P. Taylor, North Tonawanda, N.Y.; David A. Lee, Santa Monica, Calif.

[73] Assignee: Tayco Developments, Inc., North Tonawanda, N.Y.

[21] Appl. No.: 613,587

[22] Filed: May 23, 1984

[51] Int. Cl.$^4$ .............................................. B63G 13/00
[52] U.S. Cl. ........................................ 114/1; 114/270; 248/564; 248/581
[58] Field of Search ...................... 114/5, 6, 7, 1, 8, 9, 114/270; 248/564, 576, 581, 584, 585, 586, 587, 588, 589, 590, 591, 562, 636; 89/430.1

[56] References Cited

U.S. PATENT DOCUMENTS

| | | | |
|---|---|---|---|
| 2,842,356 | 7/1958 | Taylor | 267/124 |
| 3,592,422 | 7/1971 | Paine et al. | 248/581 |
| 4,105,177 | 8/1978 | Smith et al. | 248/564 |

Primary Examiner—Joseph F. Peters, Jr.
Assistant Examiner—Thomas J. Brahan
Attorney, Agent, or Firm—Joseph P. Gastel

[57] ABSTRACT

A system for mounting a device on board ship which experiences normal vibrations of a predetermined frequency and which may be subjected to high intensity shock forces including a plurality of preloaded liquid springs operable in tension and compression and oriented in a truss configuration between the deck of the ship and the device, the casings of the liquid springs having a natural frequency in excess of the normal shipboard vibrational frequencies and by virtue of being preloaded providing rigid linkages for transmitting normal shipboard vibrational frequencies to the device, the preloading being of such a magnitude to permit the liquid springs to yield in either tension or compression when the ship is subjected to high intensity shock forces such as weapons effect pulses, and the liquid springs resetting the device to its normal position relative to the ship after termination of the high intensity shock forces.

11 Claims, 4 Drawing Sheets

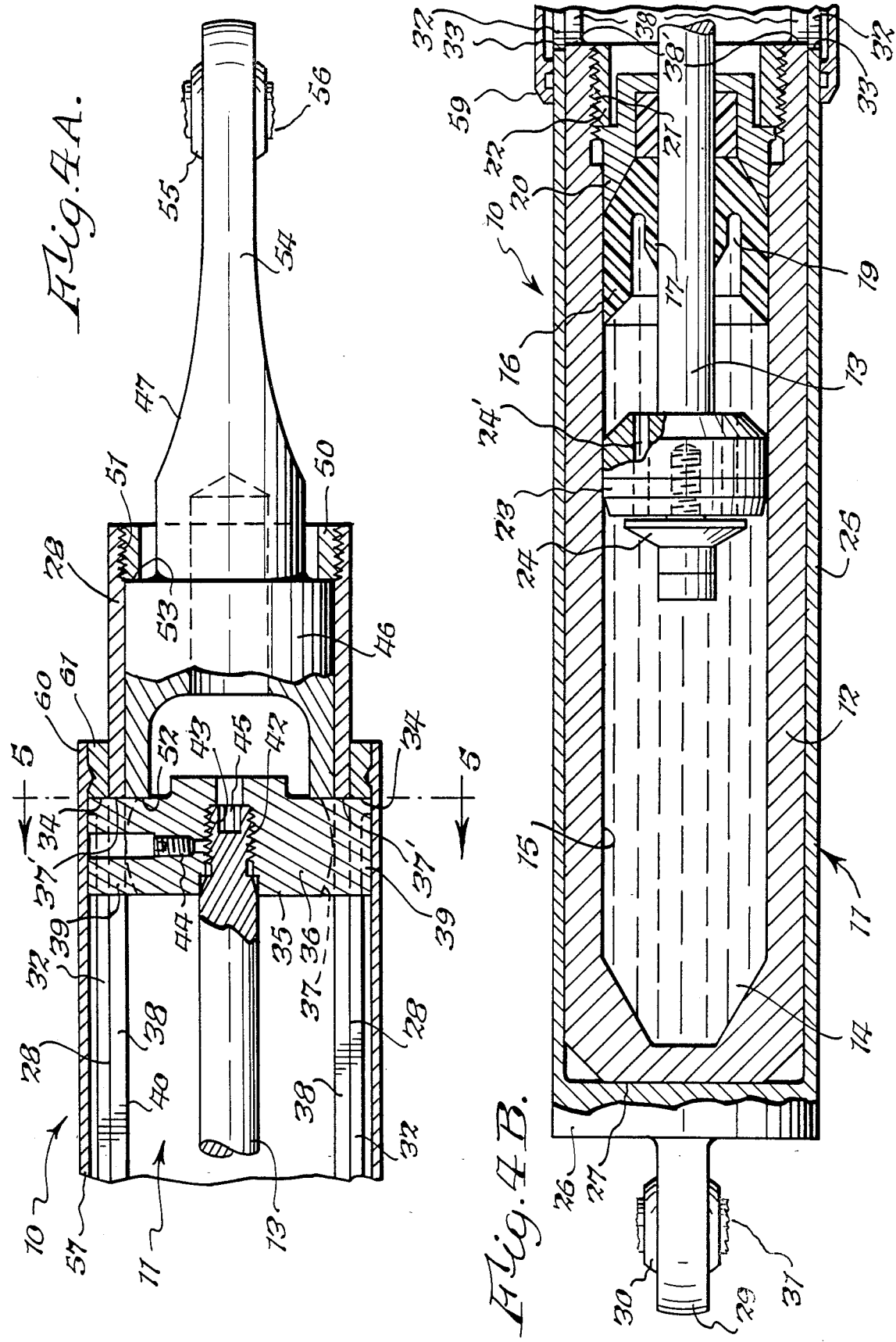

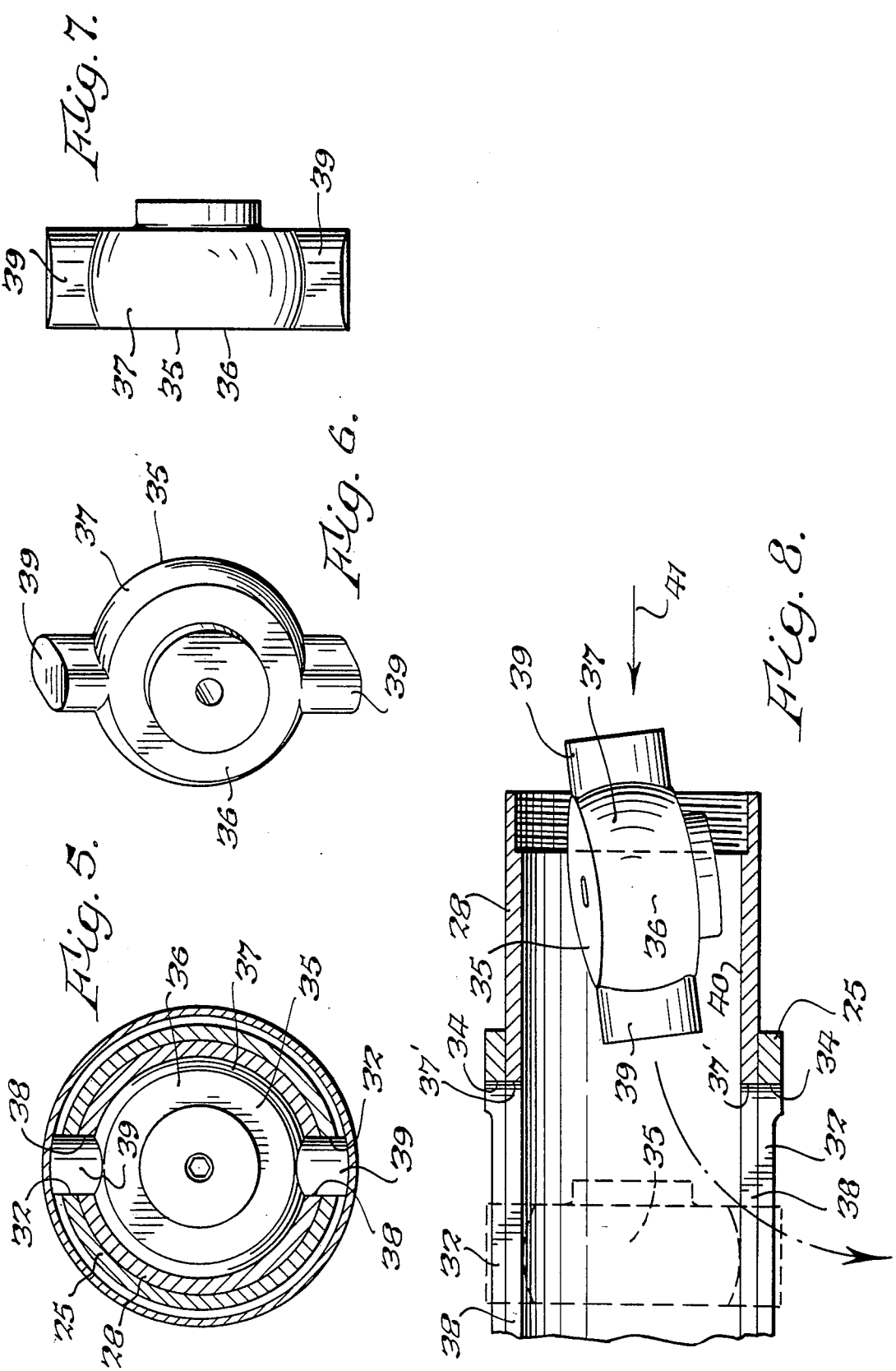

SHOCK ISOLATION METHOD AND APPARATUS FOR SHIP-MOUNTED DEVICE

BACKGROUND OF THE INVENTION

The present invention relates to a method and apparatus for mounting a device on board ship so that it will follow the normal vibrational movements of the ship but will isolate the device from shocks of high magnitude.

By way of background, gun turrets, missile launchers, or similar weapon systems must be in exact synchronism with fire control apparatus which is mounted in spaced relationship thereto on the deck of a ship in order to maintain aiming capability. However, the ship is subjected to normal high frequency low amplitude vibrations during normal operation. Therefore, to effect the exact synchronism, both the gun turret and the fire control apparatus must be rigidly secured to the deck. However, if the ship is subjected to weapons effect pulses, which are shocks of extremely high magnitude, these may pass through the rigid mountings of the fire control apparatus and severely damage its high tech sensitive electronics. In the past fire control apparatus was mounted on resilient mounts to isolate it from weapons effect pulses, but the resilient mounts were incapable of maintaining the fire control apparatus in exact synchronism with the gun turrets during normal high frequency vibrations of the vessel.

SUMMARY OF THE INVENTION

It is the primary object of the present invention to provide a method and apparatus for rigidly securing the fire control apparatus of a ship to the deck thereof so that it will remain in synchronism with a gun turret during normal high frequency vibration of the vessel, but will yield to isolate the fire control apparatus from the deck in the event that the vessel is subjected to high intensity weapons effect pulses.

Another object of the present invention is to provide an improved system for mounting a base relative to a surface. Other objects and attendant advantages of the present invention will readily be perceived hereafter.

The present invention relates to a system for mounting a device on board ship having normal ship vibrations of a predetermined frequency comprising link means which are both rigid and resilient for mounting said device on said ship in a normal predetermined fixed position when said links are rigid but which permit movement of said device in a plurality of directions when said links are resilient, preloading means for preloading said link means to a predetermined preload value to thereby cause said link means to normally act as rigid links, said link means having a natural frequency in excess of said vibrations of said predetermined frequency whereby said link means when acting as rigid links will cause said device to follow said normal ship vibrations and thus maintain said device in said normal predetermined fixed position on said ship, said link means becoming resilient and yielding only when said link means are subjected to shock forces in excess of said predetermined preload value to thereby function as springs, said link means resetting themselves after termination of said shock forces in excess of said predetermined preload value to thereby again function as rigid links.

The present invention also relates to a method of mounting a device on a ship so as to maintain a predetermined fixed relationship to said ship and thus follow vibrations of said ship but permitting said device to move away from said predetermined relationship on said ship when said ship experiences shock forces above a predetermined value and to thereafter return to said predetermined relationship on said ship comprising the steps of mounting said apparatus on said ship with links which act both as rigid links and as springs for providing movement in a plurality of directions, preloading said links so as to cause them to act as said rigid links to thus prevent their movement in said plurality of directions unless subjected to shock forces in excess of said predetermined value, said links while in a preloaded condition having a natural frequency which is greater than the frequency of said vibrations of said ship so that said device maintains said predetermined relationship with said ship while said ship is experiencing said vibrations, permitting said links to act as springs and thus to yield when said ship experiences shock forces above a predetermined value to thereby protect said device from said shock forces, and causing said links while acting as springs to return said device to said predetermined relationship on said ship after termination of said shock forces in excess of said predetermined value.

The present invention also relates to a mounting system comprising a supporting surface, a base, a plurality of liquid spring units each operable in both tension and compression oriented in a truss configuration between said supporting surface and said base, first and second ends on said liquid spring units, first ball joint means connecting said first ends to said supporting surface, and second ball joint means connecting said second ends to said base.

The various aspects of the present invention will be more fully understood when the following portions of the specification are read in conjunction with the accompanying drawings wherein:

BRIEF DESCRIPTION OF THE DRAWINGS

FIG. 4A is a fragmentary cross sectional view of one end of a tension-compression liquid spring unit;

FIG. 4B is a fragmentary cross sectional view of the opposite end of the tension-compression liquid spring unit;

FIG. 5 is a cross sectional view taken substantially along line 5—5 of FIG. 4A and showing the relationship between the various parts;

FIG. 6 is a perspective view of the spherical load member or link;

FIG. 7 is a side elevational view of the link of FIG. 6;

FIG. 8 is a fragmentary cross sectional view showing the manner in which the spherical load member or link is installed in position in the remainder of the unit tension-compression liquid spring;

DESCRIPTION OF THE PREFERRED EMBODIMENTS

Figure 1:
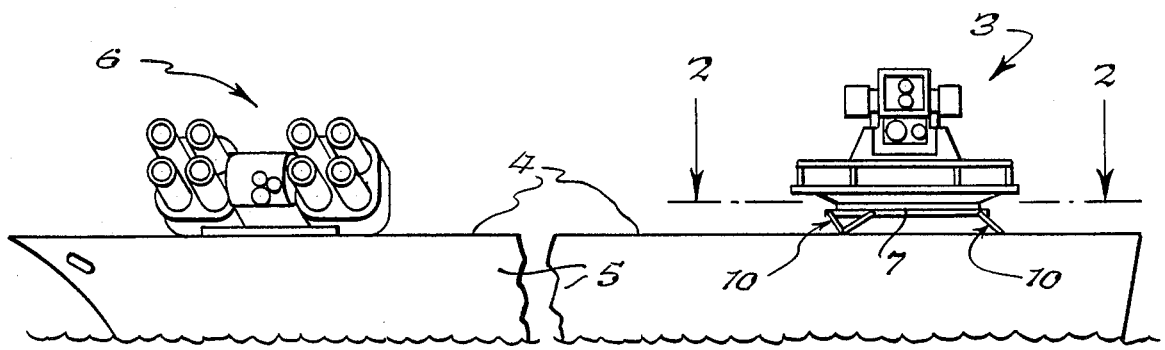
FIG. 1 is a fragmentary side elevational view of a naval vessel mounting a box-type missile launcher and a fire control apparatus in spaced relationship thereto.

The improved shock isolation system 2 of the present invention is shown in FIG. 1 as mounting a fire control apparatus 3 on the deck 4 of a naval vessel 5 in spaced relationship to an aimable weapon system 6, which may be a gun turret, missile launcher or other type of system.

As noted briefly above, the fire control apparatus 3, which comprises sensitive electronics, typically laser or radar equipment, must be secured rigidly to the deck 4 of the ship so as to maintain an exact predetermined relationship to the weapons system 6 which it controls in the well-known manner. However, vessel 5 is subjected to constant shipboard vibrations emanating from various sources, such as the ship's engines. The frequency and amplitude of these vibrations vary under different conditions, but they are generally considered to be of low amplitude and relatively high frequency in the vicinity of about 20–50 Hz, depending on the type of ship. If the fire control apparatus 3 and the weapons system 6 are rigidly affixed to deck 12, the shipboard vibrations will affect both equally and they will maintain the required alignment with each other. However, if the ship comes under attack by shell fire, missiles, etc., the ship 5 will be subjected to weapons effect shocks of extremely high intensity which are usually injurious to the sensitive fire control apparatus 3. Therefore, in the past one solution was to mount the fire control apparatus 3 on rubber or other resilient mountings so as to isolate the sensitive fire-control apparatus from the high intensity shocks. However, the resilient mountings were incapable of transmitting the shipboard vibrations, and thus they could not maintain the exact alignment between the fire control apparatus and the gun turret. Thus, there was the dilemma that normal shipboard vibrations destroyed the alignment of a resiliently-mounted fire control system, but if the fire control system was fixedly mounted on the deck to maintain the alignment, weapons effect pulses would destroy the sensitive electronic apparatus.

The improved shock isolation system of the present invention overcomes the foregoing deficiencies by not only maintaining the fire control apparatus 3 in alignment with weapon system 6 when the ship is subjected to its normal vibrational frequencies, but also isolates the fire control apparatus 3 from high intensity shipboard shocks resulting from attack, to thereby protect the sensitive instrumentation of the former.

Summarizing briefly in advance, the improved shock isolation system 2 includes a plurality of tension-compression liquid spring units 10 mounted in a truss configuration between deck 4 and the base 7 of the fire control apparatus 3, with the units 10 permitting the base to deflect in all directions, as required. However, the units 10 are internally preloaded to the centered position so that they will not stroke when they are not subjected to high intensity shocks. The steel casings of the units 10, when not stroking, will thus provide rigid linkages which have a natural frequency of vibration which is far in excess of the frequency of the vibration of the ship. This means that the base 7 will stay firmly locked to deck 4 and will follow the vibrations of the ship 5 under normal conditions. However, if the ship is subjected to a high intensity shocks or weapons effect pulses, such as is experienced when the guns are fired or which might be experienced when the ship itself is hit by gunfire and the deck 4 moves abruptly, then links 15 will yield and provide a spring action to attenuate the shock which would otherwise be transmitted to the fire control apparatus 3. After the high intensity shock passes, the links 10 will automatically reset themselves to their rigid link condition. The shock isolation system 2 is thus a passive system which maintains the fire control apparatus 3 in synchronism with the gun turret 14 notwithstanding the normal high frequency low amplitude vibrations to which the ship 13 is subjected. However, the mounting links 10 permit the base 7 to yield in all directions momentarily when the ship 5 is subjected to high intensity shocks, and then they will automatically return the base 7 to its normal locked position relative to deck 4.

Each of the tension-compression units or links 10 is identical and will be described in detail hereafter to provide a complete disclosure as to how each unit functions. However, it is to be expressly understood that the present invention is directed to the combination of the tension-compression units 10 in the above-described shipboard combination with a device such as a fire control unit 3 which must be isolated from high intensity shocks while being permitted to follow high frequency low amplitude vibrations. No claim is being made to the construction of the liquid spring tension-compression unit 10 per se, and it will be expressly understood that other types of tension-compression units, such as shown in U.S. Pat. No. 2,842,356 may be used provided that they contain the necessary characteristics to produce the above-described results.

Each liquid spring unit 10 is operable in both tension and compression and utilizes a single liquid spring 11 consisting essentially of a cylinder 12 having a piston 13 and containing a compressible liquid 14, such as a silicone liquid, in chamber 15. The unit 10 is operable to provide a hydraulic spring action in both tension and compression by virtue of the manner in which the liquid spring 11 is mechanically mounted on the remainder of the unit, thereby permitting the use of a single seal 16 which seals the compressible liquid 14 from leakage between seal 16 and cylinder 12 and between seal 16 and piston 13. In this respect, seal 16 includes an annular lip 17 which receives piston 13, and an annular chamber 19 surrounds lip 17 so that the pressurized liquid in chamber 19 will enhance the sealing relationship.

An annular metallic cap 20 screws into tapped portion 21 of the cylinder to move seal 16 to its desired position and while doing may effect compression of the compressible liquid 14 to approximately 3% or roughly about 6,000 psi internal pressure. A threaded collar 22 is also received in tapped portion 21 to hold cap 20 in position. Piston 13 mounts a shock absorber head 23 which modulates flow of liquid on opposite sides thereof to accomplish dampening, thereby causing the liquid spring to function as a spring/damper unit. A fast return valve 24 is mounted for slidable axial movement relative to shock absorber head 23 to close off ports 24 when piston 13 moves to the left and which returns to the open position shown in FIG. 4B to permit a fast return of piston 13 to the position in which it will move as the liquid 14 expands.

Figure 3B:
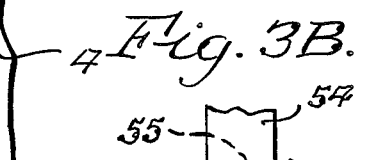
FIGS. 3A and 3B are fragmentary views of ball joint mountings at opposite ends of the tension-compression units.
Figure 3A:
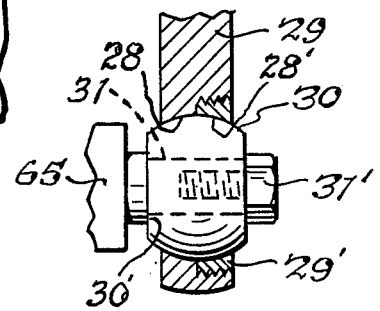

As noted briefly above, the hydraulic spring 11 is utilized in conjunction with a mechanical construction, thereby permitting the use of the single seal 16. The unit 10 includes a housing or sleeve 25 in which cylinder 12 is slidably mounted. An end wall 26 on sleeve 25 is abutted by the end wall 27 of cylinder 12 under certain conditions, as will be described hereafter. An attachment member 29 is rigidly attached to end wall 26 and pivotally mounts a spherical ball member 30 which is mounted on shaft 31 (FIGS. 3A and 4B). Housing 25 also includes a pair of diametrically opposed slots 32 (FIGS. 4A, 4B, 5 and 8). Slots 32 terminate at 33 in FIG. 4B and at 34 in FIG. 4A. A cylinder extension 28 is formed integrally with cylinder 12. Diametrically opposed slots 38 are formed in cylinder extension 28. Slots 38 terminate at 37' in FIG. 4A and at 38' in FIG. 4B.

A spherical loading member or link 35 includes a central portion 36 having a spherical outer surface 37 from which a pair of diametrically opposed pintles 39 extend. Pintles 39 ride in slots 32 and 38. The outer diameter of spherical surface 37 is slightly less than the internal diameter at 40 of cylinder extension 28. Link 35 is installed into the position shown in FIG. 4A by inserting it in the direction of arrow 41 (FIG. 8) into cylinder extension 28, as shown, and thereafter rotating link 35 to cause pintles 39 to be received in slots 38 and 32. Link 35 is shown in its rotated position in dotted lines in FIG. 8. During the installation, piston 13 is moved to the left in FIG. 4B as much as it is necessary to permit link 35 to be installed. Thereafter, piston 13 is released so that the threaded end portion 42 of piston 13 is aligned with tapped portion 43 of link 35. Thereafter, piston 13 is rotated so that a threaded connection is established between threaded end portion 42 and tapped portion 43. A set screw 44 is thereafter installed in link 35, as shown in FIG. 4A, to hold the link 35 and piston 13 in locked relationship. Piston 13 is rotated to effect the foregoing union by inserting an Allen wrench into socket 45. In the neutral position of unit 10, pintles 39 abut ends 34 and 37' of slots 32 and 38, respectively.

After the piston 13 and link 35 have been assembled, liquid spring 11 is preloaded because of the geometry of the various parts which causes piston 13 to extend into cylinder 12 a predetermined amount so that there is a quantity of liquid between piston head 23 and seal 16 to achieve desired flow characteristics. The end portion 46 of attachment member 47 is then slid into chamber 49 of cylinder extension 28. A threaded securing collar 50 is threaded into tapped portion 51 at the end of extension 28 to hold portion 46 in position with one end 52 abutting the face of link 35 and the opposite end 53 abutting annular ring 50. Attachment member 47 includes a shank portion 54 pivotally mounting a spherical ball member 55 which is mounted on shaft 56 (FIGS. 3B and 4A).

A protective sleeve 57 has one end 59 located on sleeve 25 in the position shown in FIG. 4B and the other end 60 mounted on ring 61 which is slidably mounted on cylinder extension 28. Sleeve 57 protects the inside of unit 10 against the entry of foreign matter through slots 38 and 32.

Figure 9:
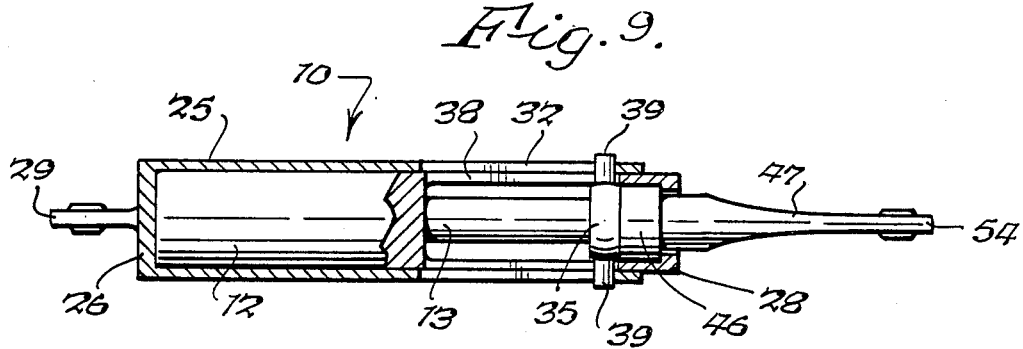
FIG. 9 is a schematic fragmentary cross sectional view of the liquid spring unit in a neutral position when it is not subjected to either tension or compression.
Figure 10:
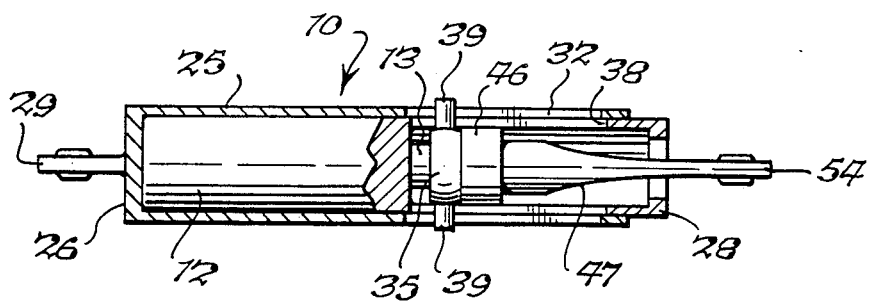
FIG. 10 is a view similar to FIG. 9 but showing the position the parts assume when the liquid spring unit is placed in compression.
Figure 11:
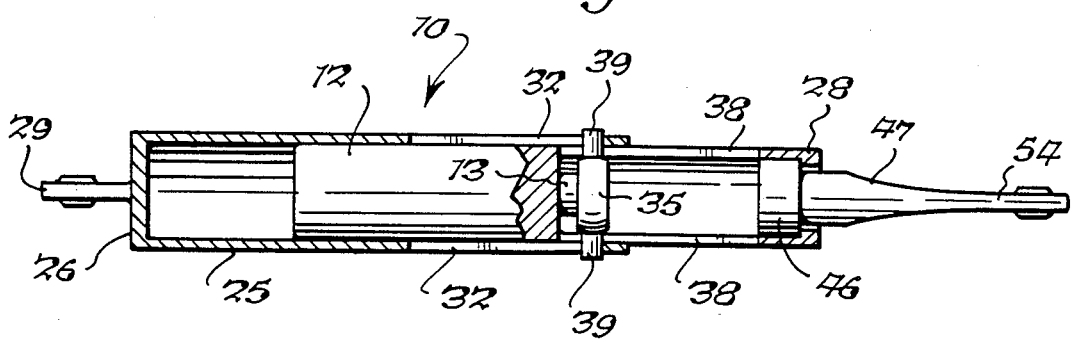
FIG. 11 is a view similar to FIG. 9 but showing the positions which the parts assume when the liquid spring unit is placed in tension.

The operation of unit 10 can best be explained by reference to FIGS. 9-11. In FIG. 9 unit 10 is shown in a neutral position, that is, it is neither placed in tension or compression, and accordingly the various parts are in the same position as shown in FIGS. 4A and 4B. When shafts 31 and 56 at the opposite ends of the tension-compression units (FIGS. 3A, 3B, 4A and 4B) are caused to approach each other, unit 10 is placed in compression. In this event, end portion 46 of attachment member 47 bears against link or load-receiving member 35 which in turn bears against the end of piston 13 driving it into cylinder 12, and the latter is held against movement because it abuts end wall 26 of sleeve 25. During the compressive action, pintles 39 ride freely in slots 38 and 32. When shafts 56 and 31 at the opposite ends of the tension-compression units are pulled apart, unit 10 is placed in tension. In this case, end portion 46 of attachment member 47 pulls on cylinder extension 28 and this causes cylinder 11 to move to the position of FIG. 11 from the position of FIG. 9. However, pintles 39 of load-bearing member or link 35 will ride in slots 38 but will abut ends 34 of slots 32, and thus link 35 will be held against movement while piston 13 bears against it and is driven into cylinder 12. Thus, essentially when unit 10 is placed in compression, the piston 13 is driven into cylinder 11, whereas when the unit is placed in tension, the cylinder 11 is caused to be driven onto piston 13. When the external forces applied to shafts 31 and 56 are removed, the inherent spring quality of liquid spring 11 will cause the unit to return to the neutral position of FIG. 6.

Figure 2:
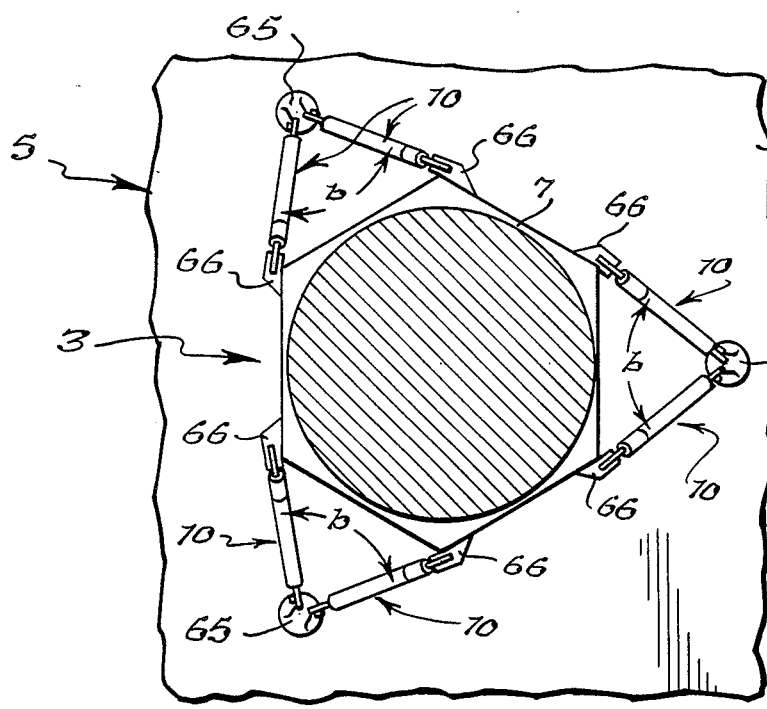
FIG. 2 is a fragmentary cross sectional view taken substantially along line 2—2 of FIG. 1 and showing the geometric orientation of the tension-compression type of liquid spring units which mount the fire control apparatus on the deck.
Figure 3:
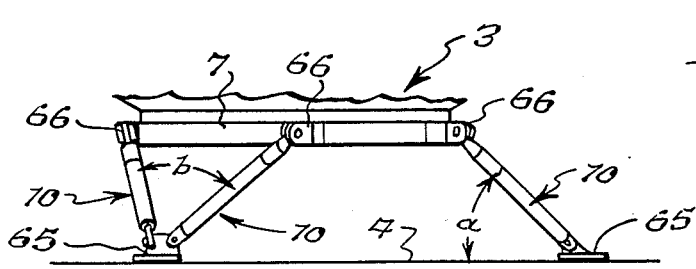
FIG. 3 is an enlarged fragmentary side elevational view of the tension-compression units mounting the fire-control apparatus.

It can readily be seen from FIG. 2 that in the present instance six tension-compression liquid spring units 10 are used in a truss configuration to secure base 7 to deck 4. The truss configuration comprises three pairs of spring units 10, with each pair oriented in the shape of a V, with the apex of the V being secured to deck 4 and the upper ends of each V being secured to base 7. As can be seen from FIG. 3, each unit 10 is inclined to deck 4 at an angle a. An angle b exists between each unit 10 of each pair of units, as can be seen from FIG. 2. However, the geometry between the units 10 themselves and the deck 4 may be changed as required, provided that base 7 will be supported for movement in all directions upon the subjecting of a plurality of the units 10 to either tension or compression.

The lower ends of the units 10 are pivotally mounted on brackets 65 by means of spherical ball members 30 mounted on shafts 31 secured to brackets 65. More specifically, each spherical ball member 30 is held against spherical surface 28 of attachment member 29 by a threaded annular member 29' having a spherical face in complementary mating relationship with ball member 30. Threaded annular member 29' is received in a mating tapped portion of attachment member 29. A shoulder 30' bears against one planar face of ball member 30 and the head of screw 31' bears against an opposite planar face of ball member 30 to confine it on shaft 31. There is a ball joint action between ball member 30 and surfaces 28 and 28'.

The upper ends of units 10 are pivotally mounted on brackets 66 by means of spherical ball members 55 mounted on shafts 56 secured to brackets 66. More specifically, each bracket 66 includes spaced arms 66' and 66" which abut opposite planar faces (not numbered) of spherical ball member 55 which is mounted in shank portion 54 of attachment member 47. There is a ball joint action between shank portion 54 and spherical ball member 55. Shaft 56 is the shank of a bolt member 58 having a threaded end received in arm 66" and a frustoconical head received in arm 66'. Shank portion 54 may be mounted on ball member 55 by the same construction described relative to FIG. 3A. Thus, both the upper and lower ends of each unit 10 are secured to associated structure by ball joints which permit relative movement between them and parts connected to them in all directions.

As long as units 10 do not elongate or shorten, the units 10 in combination with each other will provide a rigid truss construction which will prevent movement of base 7, notwithstanding that ball joints are located at the ends of units 10. It will be appreciated that there is sufficient clearances between the ends of the tension-compression units and their supporting brackets 65 and 66 to accommodate the desired range of movement of base 7. While specific types of ball joints have been shown at the ends of the tension-compression units, it will be appreciated that any other suitable ball joints or their equivalents, such as universal joints, may be used.

As noted above, each of the units 10 is preloaded so that it acts as a rigid link. Thus, if the shipboard vibration is in the 20-50 Hz range, and if the natural frequency of the units 10 is in excess of approximately 150 Hz, the fire control apparatus will follow the shipboard vibration without appreciable loss of alignment. In other words, before the units 10 act as springs, that is, when they are in their neutral position, their spring rate is that of the metal tubes which form the units 10, and these are very rigid because they are preloaded to between about 3G's and 5G's so as not to allow shipdeck accelerations to overcome the preload. However, if there is a weapons effect shock or other type of shock in excess of the preloading, the units 10 will function as spring/damper units and thus absorb the energy which would otherwise be transmitted to the fire control apparatus 3. After the weapons effect pulses pass, the units 10 will reset themselves to function as rigid links. Thus, the double-acting liquid spring units 10 provide a dual shock handling system, namely, (1) a system for following normal high frequency vibrations whereby the fire control apparatus follows the shipboard vibrations without losing its alignment with the deck and (2) a weapons effect isolation system for permitting the spring units to stroke off of their preloaded positions to attenuate energy with a low rate spring action, and after the shock effect has terminated to restore the system to a condition wherein units 10 again function as rigid links.

By way of example, if the fire control apparatus 3 weighs about 1,000 pounds and is mounted on a ship deck which has a natural frequency of 50 Hz and a sharpness of vibration of 5 G's maximum and it is supported on six tension-compression units 10 as shown, the units 10 are preloaded to provide a total of 12 G's preload and each unit 10 must have at least five square inches of steel minimum effective cross sectional area and a length of approximately 22 inches to give a 500 Hz natural frequency prior to break-away, that is, before any one of the units 10 yields. Thus, there is a ratio of about 10:1 between the natural frequency of the link system and the natural frequency of the deck. This ratio should be at least 4:1, and preferably up to about 10:1. It may also be higher than 10:1, but the higher the ratio, the greater will be the weight of the links, so that the higher ratios are limited by the allowable weights of the links. After break-away, the natural frequency of the system will be approximately 6 Hz, which provides a very soft spring support able to attenuate a shock pulse input. The spring action of the links should be suitably soft to attenuate shock pulses without imparting high G loading to the system, and generally the isolation natural frequency after breakaway should be lower than the shock frequency by a factor of at least about three. After the external shock terminates, the units 10 will return to their normal locked positions wherein they again function as rigid links. As indicated above, the preload of the units 10 must be greater than the sharpness of vibration, and, further, the preload should be sufficiently low so that the attenuation will occur whenever the shock forces are of a value which might injure the control apparatus.

While the foregoing description has been primarily directed to a specific concept of shock isolation on board ship, it will be appreciated that the truss construction of tension-compression liquid spring units may also be employed in other environments to support any type of base relative to any type of deck or supporting surface.

It can thus be seen that the present invention is manifestly capable of achieving the above objects, and while a preferred embodiment has been disclosed, it will be understood that the present invention is not limited thereto, but may be otherwise embodied within the scope of the following claims.

What is claimed is:

1. A system for mounting a device on board ship having normal ship vibrations of a predetermined frequency comprising a plurality of link means which are both rigid and resilient for mounting said device on said ship in a normal predetermined fixed position when said links are rigid but which permit movement of said device in a plurality of directions when said links are resilient, each of said link means comprising liquid spring means operable in both tension and compression and preloaded to a predetermined preload value to thereby cause said link means to normally act as rigid links, said link means having a natural frequency in excess of said vibrations of said predetermined frequency whereby said link means when acting as rigid links will cause said device to follow said normal ship vibrations and thus maintain said device in said normal predetermined fixed position on said ship, said link means becoming resilient and yielding only when said link means are subjected to shock forces in excess of said predetermined preload value to thereby function as springs, said liquid spring means including self-contained means for resetting said liquid spring means after termination of said shock forces in excess of said predetermined preload value to thereby again function as rigid links, said link means being in a truss-like strut orientation to attenuate said shock forces from all directions, and said truss strut orientation comprising three pairs of two liquid springs, with each pair forming an upwardly oriented V-like configuration having lower and upper end, said lower end of each V-like configuration originating from a common area and said upper ends being attached to said device at spread-apart locations.

2. A system as set forth in claim 1 wherein said lower ends lie on a first perimeter, and wherein said upper ends lie on a second perimeter which is smaller than said first perimeter.

3. A mounting system comprising a supporting surface, a base, a plurality of liquid spring units each operable in both tension and compression oriented in a truss configuration between said supporting surface and said base, first and second ends on said liquid spring units, first ball joint means connecting said first ends to said supporting surface, and second ball joint means connecting said second ends to said base, said first ball joint means being located on a first perimeter, said second ball joint means being located on a second perimeter which is smaller than said first perimeter, and said plurality of liquid spring units comprising three pairs of liquid spring units, with each pair oriented in a V-configuration oriented 120° from each adjacent V-configuration.

4. A mounting system comprising a supporting surface, a base, a plurality of link means which are both rigid and resilient for mounting said base on said supporting surface in a predetermined fixed position when said link means are rigid but which permit movement of said base in a plurality of directions when said link means are resilient, each of said link means including a spring unit operable in both tension and compression, said link means being oriented in a truss configuration between said supporting surface and said base, first and second ends on said link means, first joint means connecting said first ends to said supporting surface for universal movement, and second joint means connecting said second ends to said base for universal movement, said plurality of link means comprising three pairs of link means, with each pair oriented in a V-configuration oriented substantially 120° from each adjacent V-configuration.

5. A mounting system as set forth in claim 4 wherein said first joint means are located on a first perimeter, and wherein said second joint means are located on a second perimeter which is smaller than said first perimeter.

6. A mounting system comprising a first member, a second member, a plurality of link means which are both rigid and resilient extending between said first and second members for mounting said second member on said first member in a predetermined fixed position when said link means are rigid but which permit movement of said first member in a plurality of directions when said link means are resilient, each of said link means including a link having a spring unit operable in both tension and compression, first and second ends on each of said links, first joint means connecting said first ends of said links to one of said members for permitting universal movement therebetween, second joint means connecting said second ends of said links to the other of said members for permitting universal movement therebetween, said links being oriented in a truss configuration comprising a plurality of pairs of said links with the links of each pair being spaced further apart at said second ends than at said first ends and thus diverging between said first and second ends, and said pairs of links being spaced circumferentially about portions of said first and second members, and each of said pairs of links converging toward each other.

7. A mounting system as set forth in claim 6 wherein the links of each pair lie substantially within a plane, and wherein the planes of the pairs of links intersect each other.

8. A mounting system as set forth in claim 6 wherein said first member is a supporting surface, and wherein said second member is a base of a device which is supported relative to said supporting surface.

9. A mounting system as set forth in claim 6 wherein said pairs of links converge toward said first member.

10. A mounting system as set forth in claim 9 wherein said first ends are on said first member, and wherein said second ends are on said second member.

11. A mounting system comprising a first member, a second member, a plurality of link means which are both rigid and resilient extending between said first and second members for mounting said first member on said second member in a predetermined fixed position when said link means are rigid but which permit movement of said first member in a plurality of directions when said link means are resilient, each of said link means including a link having a spring unit operable in both tension and compression, first and second ends on each of said links, first joint means connecting said first ends of said links to one of said members for permitting universal movement therebetween, second joint means connecting said second ends of said links to the other of said members for permitting universal movement therebetween, said links being oriented in a truss configuration about portions of each of said members, said truss configuration comprising a plurality of pairs of said links with the links of each pair substantially defining two sides of a triangle with the other side of said triangle being effectively defined by a portion of one of said members.

* * * * *